US012742885B2

(12) United States Patent
Cohen

(10) Patent No.: US 12,742,885 B2
(45) Date of Patent: Sep. 22, 2026

(54) ATMOSPHERE-PENETRATING LASER

(71) Applicant: David Cohen, Herzliya (IL)

(72) Inventor: David Cohen, Herzliya (IL)

( * ) Notice: Subject to any disclaimer, the term of this patent is extended or adjusted under 35 U.S.C. 154(b) by 0 days.

(21) Appl. No.: 18/370,898

(22) Filed: Sep. 21, 2023

(65) Prior Publication Data

US 2024/0012153 A1 Jan. 11, 2024

Related U.S. Application Data

(63) Continuation of application No. PCT/IL2021/051262, filed on Oct. 25, 2021.

(30) Foreign Application Priority Data

Oct. 25, 2020 (IL) .......................................... 278274
Mar. 24, 2021 (IL) .......................................... 282027

(51) Int. Cl.
*G01S 17/95* (2006.01)
*G01S 7/481* (2006.01)
*G02B 27/10* (2006.01)

(52) U.S. Cl.
CPC ............ *G01S 17/95* (2013.01); *G01S 7/4815* (2013.01); *G02B 27/1006* (2013.01)

(58) Field of Classification Search
CPC ... G01S 17/95; G01S 7/4815; G02B 27/1006; Y02A 90/10
See application file for complete search history.

(56) References Cited

U.S. PATENT DOCUMENTS 5,404,365 A * 4/1995 Hiro ..................... H01S 5/4025 372/27
5,430,293 A * 7/1995 Sato ........................ G01M 3/38 250/338.5
5,589,684 A * 12/1996 Ventrudo ........... G02B 6/02076 250/225
5,777,768 A * 7/1998 Korevaar ........... H04B 10/1127 398/152
5,854,422 A * 12/1998 McKeon ................ G01M 3/38 73/592

(Continued)

FOREIGN PATENT DOCUMENTS

| | | |
|---|---|---|
| CN | 110572207 | 12/2019 |
| EP | 3490167 | 5/2019 |
| GB | 1136032 | 12/1968 |
| WO | WO 2019/038585 | 2/2019 |
| WO | WO 2022/085012 | 4/2022 |

OTHER PUBLICATIONS

"Combining Lasers for Powerful Lidars", Onera, The French Aerospace Lab, Zoom in the Lab—Issue 55. Jul. 17, 2014. https://www.onera.fr/en/news/combining-lasers-for-powerful-lidars (Year: 2014).*

(Continued)

*Primary Examiner* — Abdallah Abulaban
*Assistant Examiner* — Amie M N'Dure

(57) ABSTRACT

A laser beam for improved atmospheric penetration is produced by a device having two or more laser sources each producing a laser beam of a different wavelength. The beams are combined by an optical combiner into a composite beam having at least two wavelengths, so that the different properties of the different wavelengths may combine to improve atmospheric penetration.

21 Claims, 15 Drawing Sheets

(56) References Cited

U.S. PATENT DOCUMENTS

| | | | | |
|---|---|---|---|---|
| 7,106,972 | B2 * | 9/2006 | Alfano | H04B 10/1121 398/119 |
| 7,627,249 | B1 * | 12/2009 | Izadpanah | H04B 10/1121 398/115 |
| 10,069,564 | B2 * | 9/2018 | Hening | G02B 27/10 |
| 2003/0048499 | A1 * | 3/2003 | Alfano | H04B 10/1121 398/5 |
| 2004/0021949 | A1 * | 2/2004 | Grier | C12N 15/87 359/558 |
| 2007/0127926 | A1 * | 6/2007 | Marioni | H04B 10/1121 398/118 |
| 2008/0279558 | A1 | 11/2008 | Capron et al. | |
| 2010/0215066 | A1 | 8/2010 | Mordaunt et al. | |
| 2011/0080311 | A1 * | 4/2011 | Pushkarsky | B82Y 20/00 372/98 |
| 2012/0134682 | A1 * | 5/2012 | Capron | H04B 10/112 398/152 |
| 2013/0314694 | A1 * | 11/2013 | Tchoryk, Jr. | G01S 17/58 356/28.5 |
| 2014/0268314 | A1 * | 9/2014 | Dueck | H01S 3/005 359/566 |
| 2016/0139417 | A1 | 5/2016 | Moffatt et al. | |
| 2016/0254865 | A1 | 9/2016 | Hening et al. | |
| 2017/0307736 | A1 * | 10/2017 | Donovan | G01S 7/484 |
| 2018/0059023 | A1 * | 3/2018 | Blagojevic | G01N 21/6486 |
| 2020/0057142 | A1 * | 2/2020 | Wang | G01S 7/484 |
| 2020/0183062 | A1 * | 6/2020 | Wang | G02B 27/1086 |
| 2020/0191957 | A1 * | 6/2020 | Wang | G02B 19/0057 |
| 2020/0225350 | A1 * | 7/2020 | Zhang | G01S 7/497 |
| 2020/0249350 | A1 * | 8/2020 | Schmalenberg | G01S 17/34 |

OTHER PUBLICATIONS

"Remote Sensing: Absorption Bands and Atmospheric Windows". NASA Earth Observatory Articles. Published Sep. 17, 1999. https://earthobservatory.nasa.gov/features/RemoteSensing/remote_04.php (Year: 1999).*

Office Action Dated Oct. 31, 2023 From the Israel Patent Office Re. Application No. 278274. (4 Pages).

International Preliminary Report on Patentability May 4, 2023 From the International Bureau of WIPO Re. Application No. PCT IL2021/051262. (9 Pages).

International Search Report and the Written Opinion Dated Feb. 23, 2022 From the International Searching Authority Re. Application No. PCT/IL2021/051262. (13 Pages).

Office Action Dated Apr. 19, 2023 From the Israel Patent Office Re. Application No. 282027. (4 Pages).

Supplementary European Search Report and the European Search Opinion Dated Dec. 10, 2024 From the European Patent Office Re. Application No. 21882336.7. (11 Pages).

Office Action Dated Feb. 17, 2025 From the Israel Patent Office Re. Application No. 278274. (5 Pages).

Office Action Dated Mar. 17, 2025 From the Israel Patent Office Re. Application No. 282027. (5 Pages).

Office Action Dated Dec. 10, 2025 From the Israel Patent Office Re. Application No. 278274. (5 Pages).

Examination Report Under Sections 12 & 13 of the Patents Act, 1970 and the Patents Rules, 2003 Dated Jul. 14, 2026 From the Government of India, Intellectual Property India, Patents, Designs, Trade Marks, Geographical Indications, The Patent Office Re. Application No. 202327055092. (7 pages).

* cited by examiner 26
24
16
25
22
20
20
10
12
18
14

122
120

ATMOSPHERE-PENETRATING LASER

RELATED APPLICATIONS

This application is a Continuation of PCT Patent Application No. PCT/IL2021/051262 having international filing date of Oct. 25, 2021, which claims the benefit of priority of Israel Patent Application Nos. 282027 filed on Mar. 24, 2021 and 278274 filed on Oct. 25, 2020. The contents of the above applications are all incorporated by reference as if fully set forth herein in their entirety.

FIELD AND BACKGROUND OF THE INVENTION

The present invention relates to a device and method for improving atmospheric penetration by laser.

Lasers, first invented in the 1960's, are now widely used in numerous applications. Some of those applications require the laser beam to penetrate distances through the atmosphere. Such applications include but are not limited to LIDAR, laser range finding, laser guidance systems for weapons and missile defense systems.

However laser energy tends to get absorbed by the atmosphere creating a "thermal blooming" phenomena, so whereas a very small low power laser beam may travel tens of kilometers in a light guide and carry signals, in the atmosphere the beam energy is attenuated due to a plurality of factors such as air composition at deferent altitude, moisture content, temperature, dust, etc., thus long distance applications need relatively high power laser beams to have any effect at a distance. LIDAR and Laser range finding and guidance systems require some but not much energy to reach the target but a laser beam intended for destroying incoming missiles does depend on the amount of energy reaching the target. In particular, atmospheric conditions define the extent to which the laser beam is attenuated, so that on some days a given output power may be sufficient and on other days it may not.

A way of making atmospheric penetration by a laser beam more effective and more predictable would thus be welcome.

SUMMARY OF THE INVENTION

The present inventors noted that different wavelengths of laser react in different ways to a plurality of atmospheric factors. Thus long but lower energy red wavelengths tend to be simply blocked whereas short higher energy wavelengths tend to heat the moisture etc and thus dissipate their energy.

Thus the idea is to provide two or more laser beams of different wavelength and combine them into a single beam, typically using optics. The resulting composite beam may then combine the behaviors of both wavelengths and provide improved penetration through the atmosphere. Thus as a non-limiting example, the higher energy beam may heat the atmosphere along the length of the beam causing moisture and dust to dissipate and create a tunnel for the lower energy beam.

According to an aspect of some embodiments of the present invention there is provided a devicecomprising:

- a first laser source co nfiguredproduce a laser beam of a first wavelength;
- at least a second laser source configured to produce a laser beam of a second wavelength; and
- an optical combiner configured to car bine the first and at least the second laser beams into a single composite beam having at least two wavelengths.

In embodiments, the first wavelength is from the red end of the spectrum and the second wavelength is from the blue end of the spectrum.

In embodiments, the first wavelength and the second wavelength are selected for their different behaviors during atmospheric penetration.

Embodiments may have three, four, five, six or more laser sources, each with different wavelengths, or some may have the same wavelengths but may be pulsed differently.

In embodiments, one of the wavelengths is selected as a transport wavelength, to clear a path through the atmosphere and ensure that a second of the wavelengths arrives at a target with a minimum of attenuation.

In embodiments, the combined beam comprises the transport wavelength alongside or surrounding the second of the wavelengths, thereby to clear a path in the vicinity of the second of the wavelengths.

According to a second aspect of the present nvention, there is provided a laser beam in the atmosphere, the laser beam comprising at least two wavelengths, each wavelength selected for a different behavior during atmospheric penetration.

The beam may have three or more different wavelengths or pulse patterns.

In embodiments of the device or of the laser beam, one of the wavelengths is selected to heat water vapor encountered more than other wavelengths, thereby to clear a path for the other wavelengths by heating the vapor and causing currents of air to remove dust and water vapor from the path.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced. In the drawings:

FIG. 1 is simplified diagram showing a device for producing a laser beam for improved atmospheric penetration according to a first embodiment of the present invention;

FIGS. 2A-B are a cross-section of a variation of the device of FIG. 1;

DESCRIPTION OF SPECIFIC EMBODIMENTS OF THE INVENTION

Figure 1:
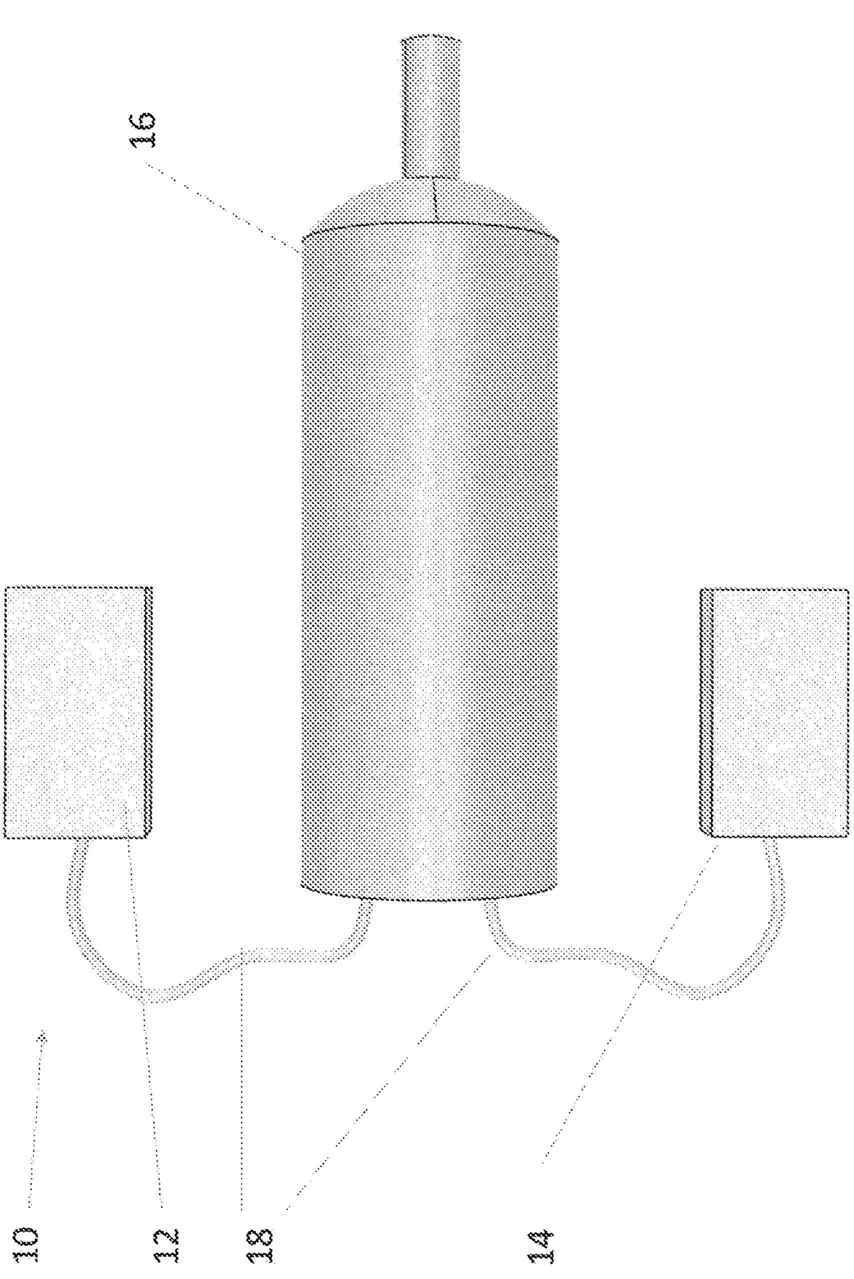

The present invention relates to a device for improving the atmospheric penetration of laser beams.

In the present embodiments, two or more lasers of different wavelengths and an optical combiner are provided. A single composite beam is produced which then combines the abilities of all the wavelengths included in order to improve atmospheric penetration.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 illustrates a device 10 having two laser sources 12 and 14, each connected to an optical combiner 16, which combines the lasers into a single composite beam.

The first laser source 12 produces a laser beam of a first wavelength. The second laser source 14 produces a laser beam having a second wavelength different from the first wavelength. Further laser sources may be added to increase the number of wavelengths used.

The optical combiner 16 may combine the first, second and any other laser beams into a single composite beam having both wavelengths. The beam may include the different wavelengths directly following a single path or the beam may be shaped so that one wavelength surrounds the other or is next to the other, as will be explained below.

The laser sources are optically connected to the optical combiner 16, for example using optical fibers 18.

Figure 2A:
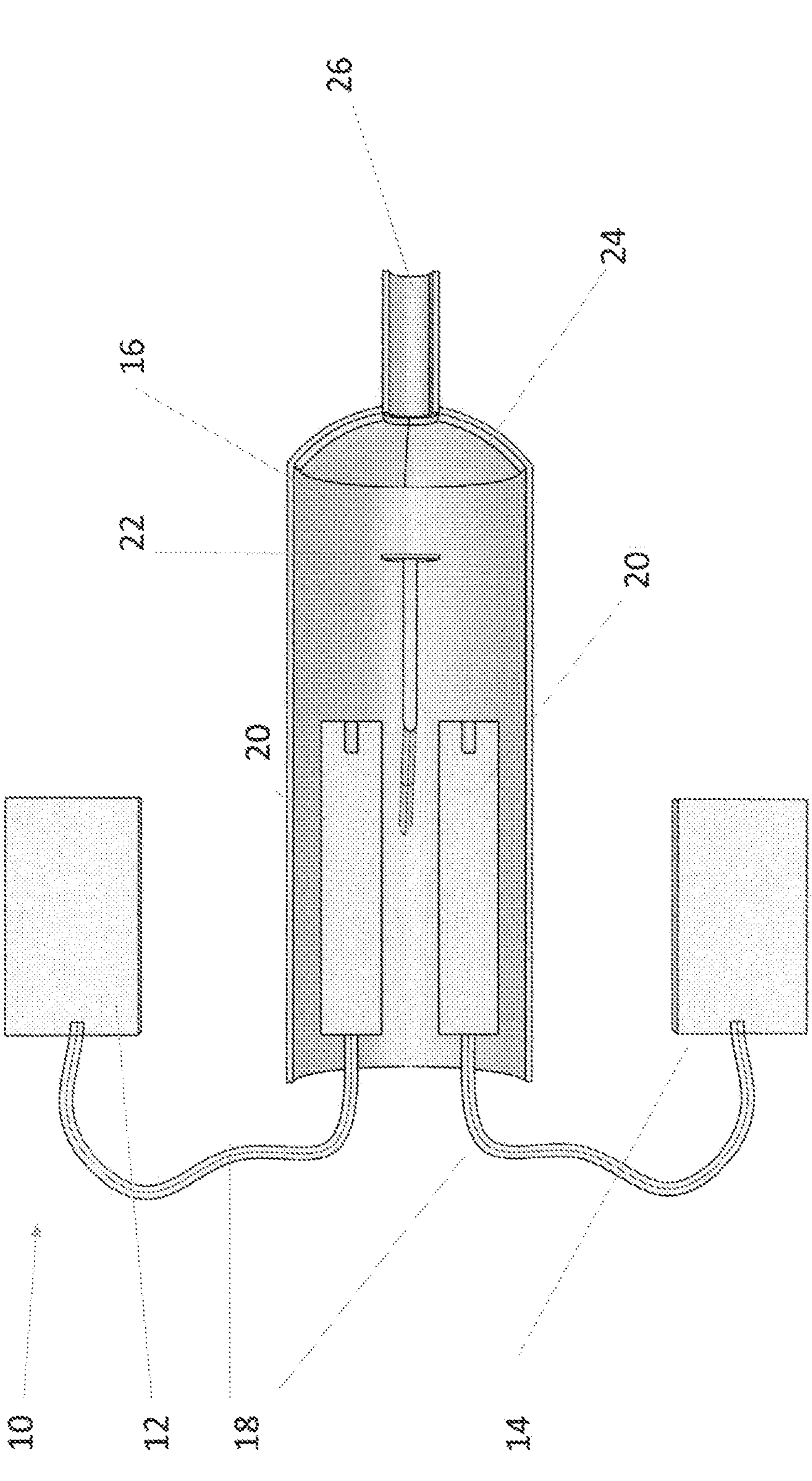
Figure 2B:
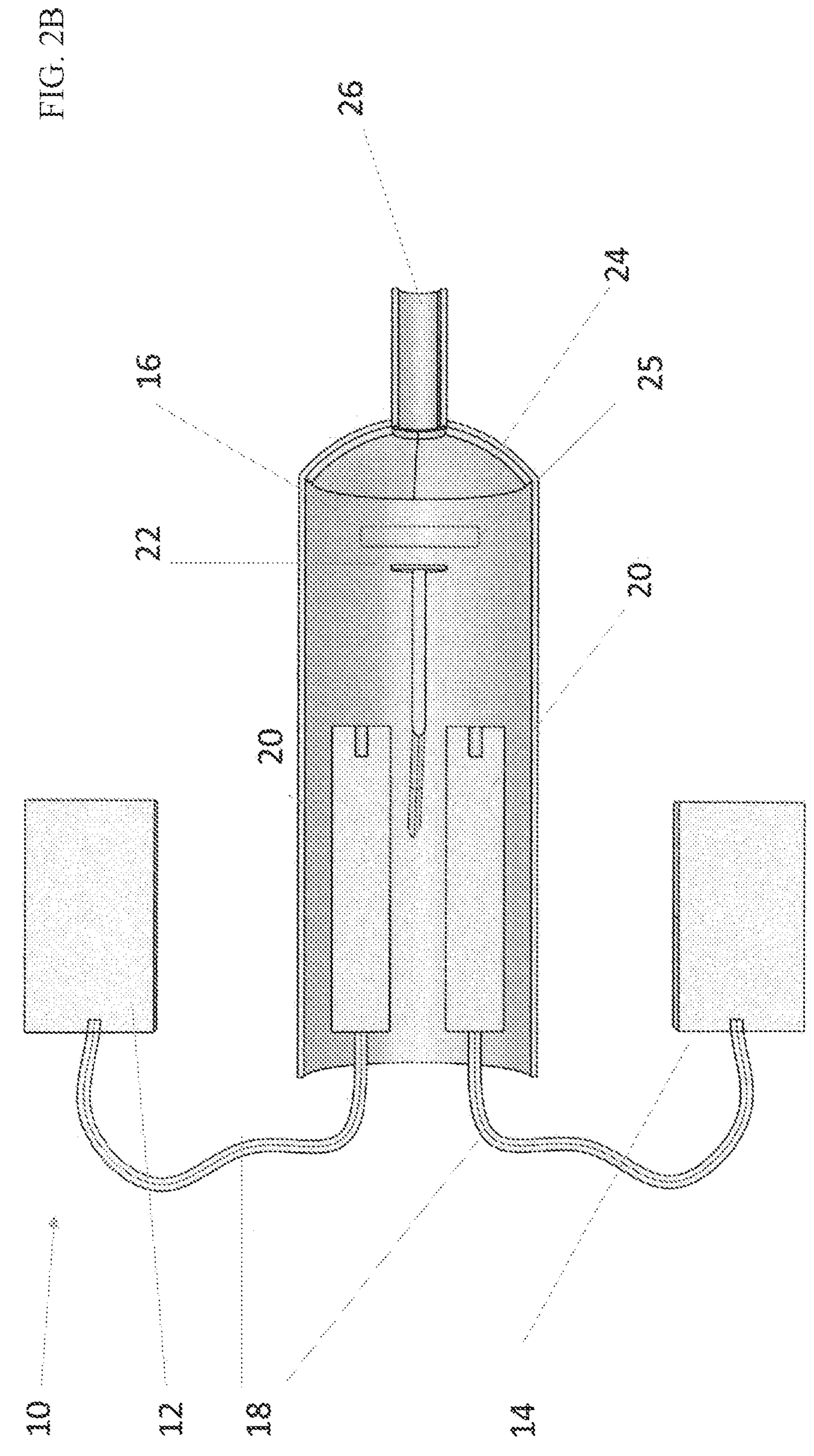

Reference is now made to FIGS. 2A-B, which is a cross section of the device of FIG. 1. Parts that are the same are given the same reference numerals and are not described again except as required for an understanding of the present view. The laser sources 12 and 14 provide their laser energy to the optical fibers 18 which end at terminations 20 in the combiner 16. The combiner 16 comprises an arrangement of mirrors and/or lenses that receives and combines the two wavelengths into a single beam. Specifically, mirrors 22 and 24 serve to combine the beams into a single beam and reflect them out through outlet 26. It is noted that the mirror 24 has a suitable shape such as a parabolic surface not shown) to deflect the beams from either side towards the outlet.

Reference is now made to FIG. 2B which is a cross-section as with FIG. 2A but of a variation of the device of FIG. 1 in which a lens 25 is added between the mirror 24 and mirror 22. The lens may change the focus of the beam to carry out beam shaping or widen or narrow the beam path. The lens may be centrally located as shown or may be to the side to intercept just one of the beams prior to combination.

Figure 3:
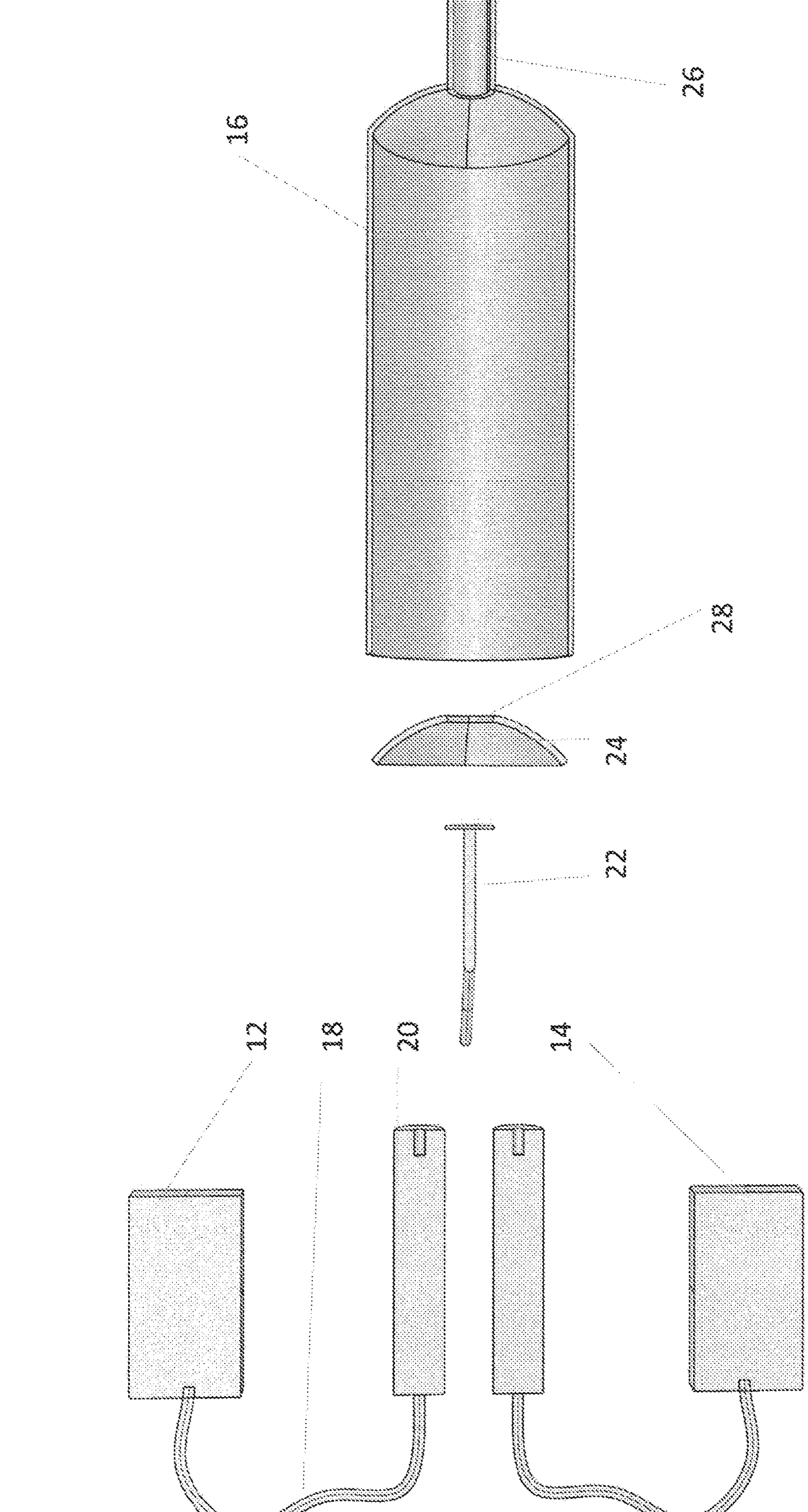
FIG. 3 is an exploded diagram showing the parts of the device of FIGS. 2A-B.
Figure 4:
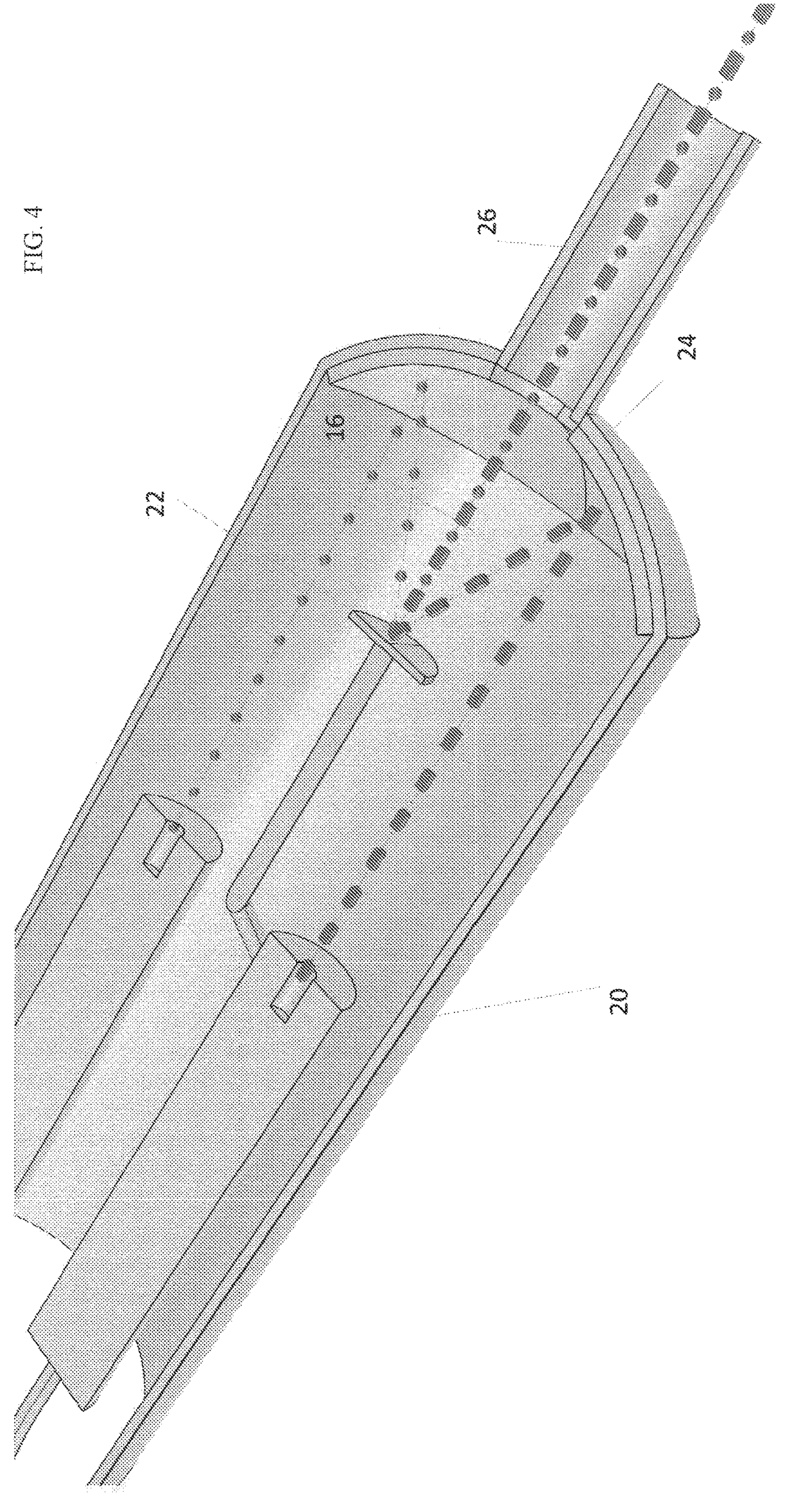
FIG. 4 is a cross-sectional view of the device of FIG. 1 showing beam paths.

Reference is now made to FIG. 3, which is an exploded diagram showing the parts of FIGS. 2A-B. As shown the mirror 24 has a central opening 28 to allow the combined beam to pass outwardly to outlet 26. As shown in greater detail in FIG. 4 the first laser source produces beam 30 and the second laser source produces beam 32. The mirror 24 receives the beams 30 and 32 at either side from each of the laser sources and reflects them back to mirror 22. Mirror 22 receives the beams at an angle from mirror 24 and directs them together towards the opening 28 in mirror 24 and through to outlet 26.

Figure 5:
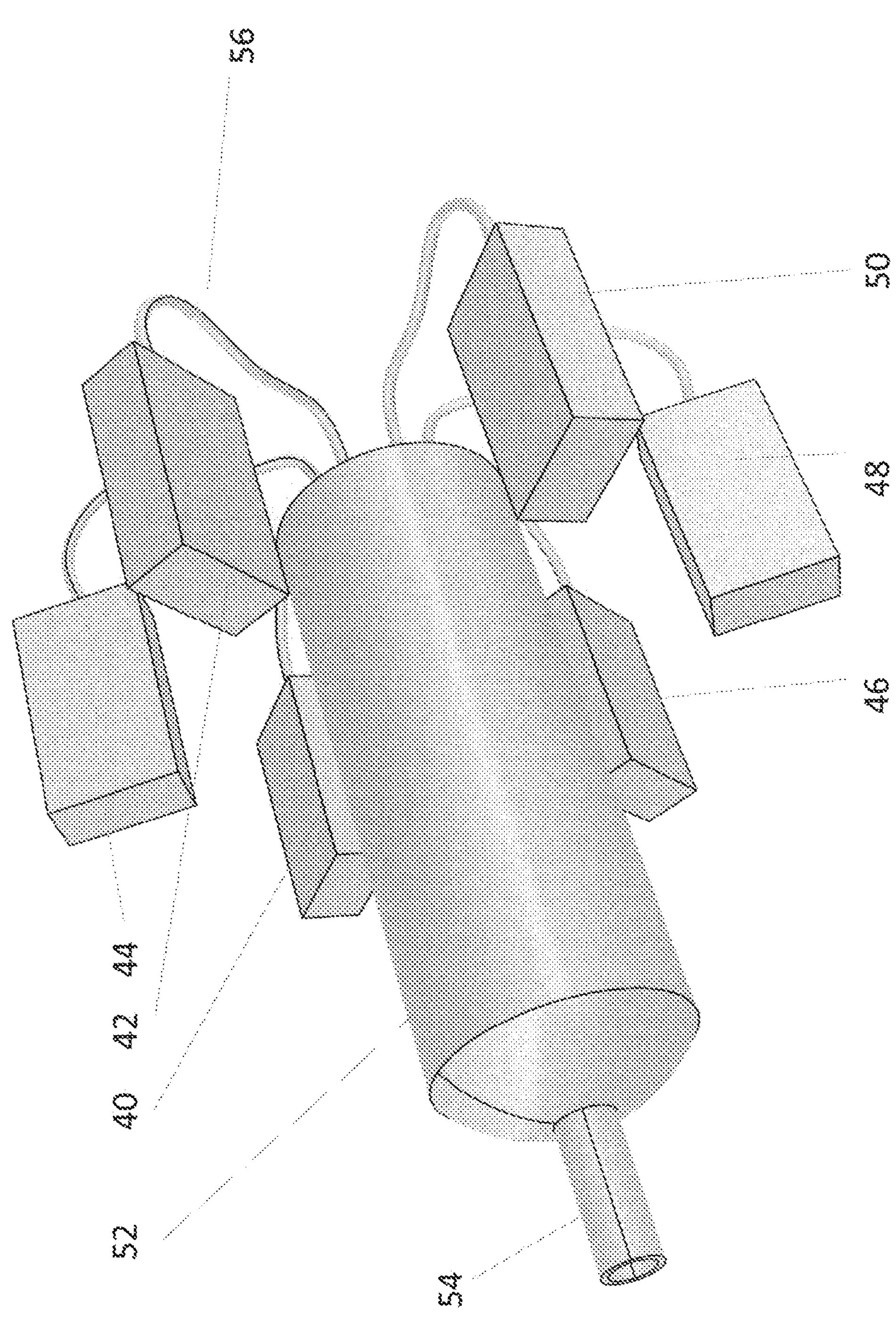
FIG. 5 is a view of a second embodiment of the present invention.

Reference is now made to FIG. 5, which is a simplified diagram showing a variation of the embodiment of FIG. 1 in which multiple laser sources are used to provide the composite beam. Three, four, five, six or more wavelengths may be used, and the present figure illustrates a six wavelengths. More particularly, laser sources 40, 42, 44, 46, 48 and 50 are connected to combiner 52 which has outlet 54 for outputting the composite laser beam. The laser sources are connected to the combiner via optical fibers 56.

Figure 6:
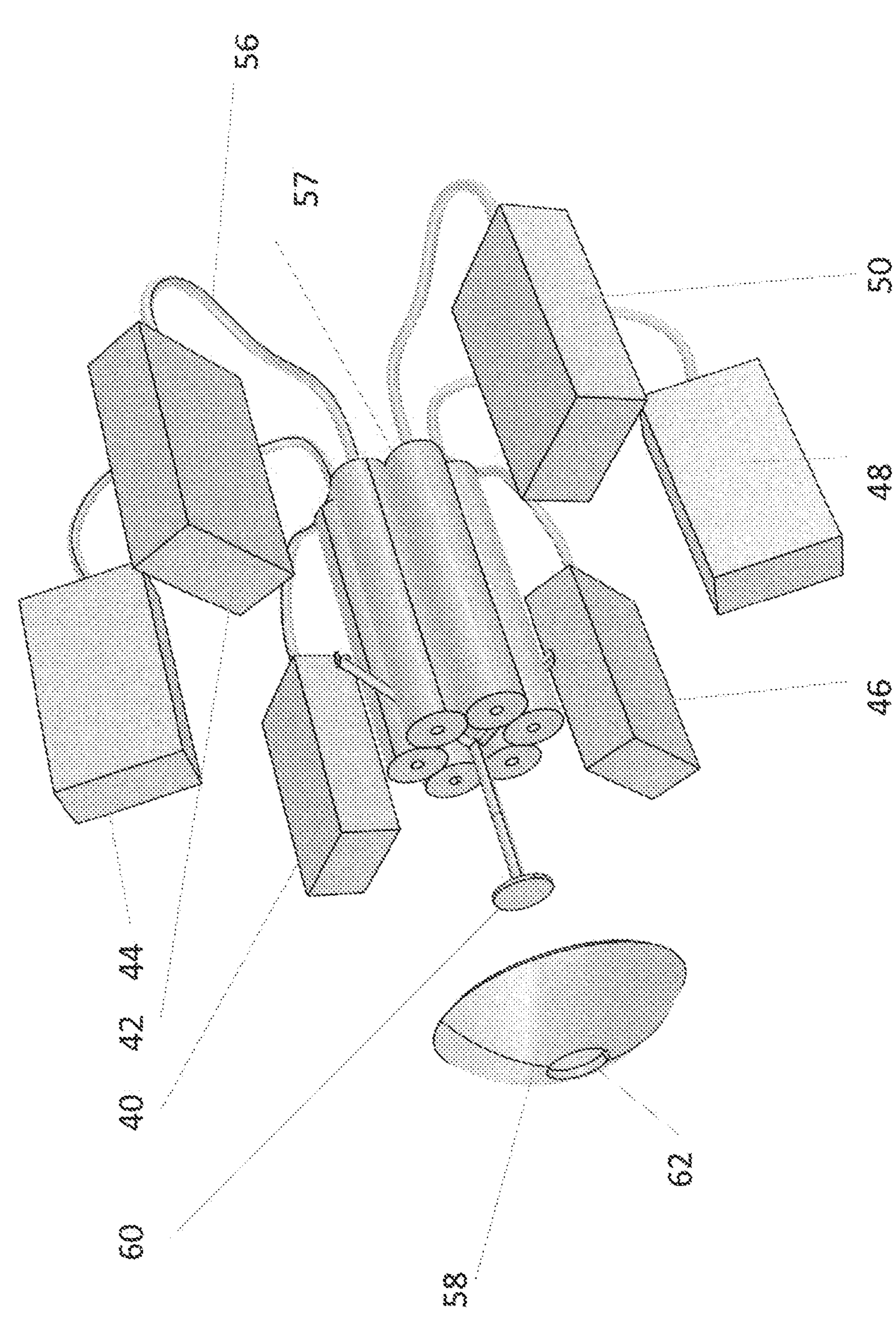
FIG. 6 is a view of the device of FIG. 5 with the cover of the combiner removed.
Figure 7:
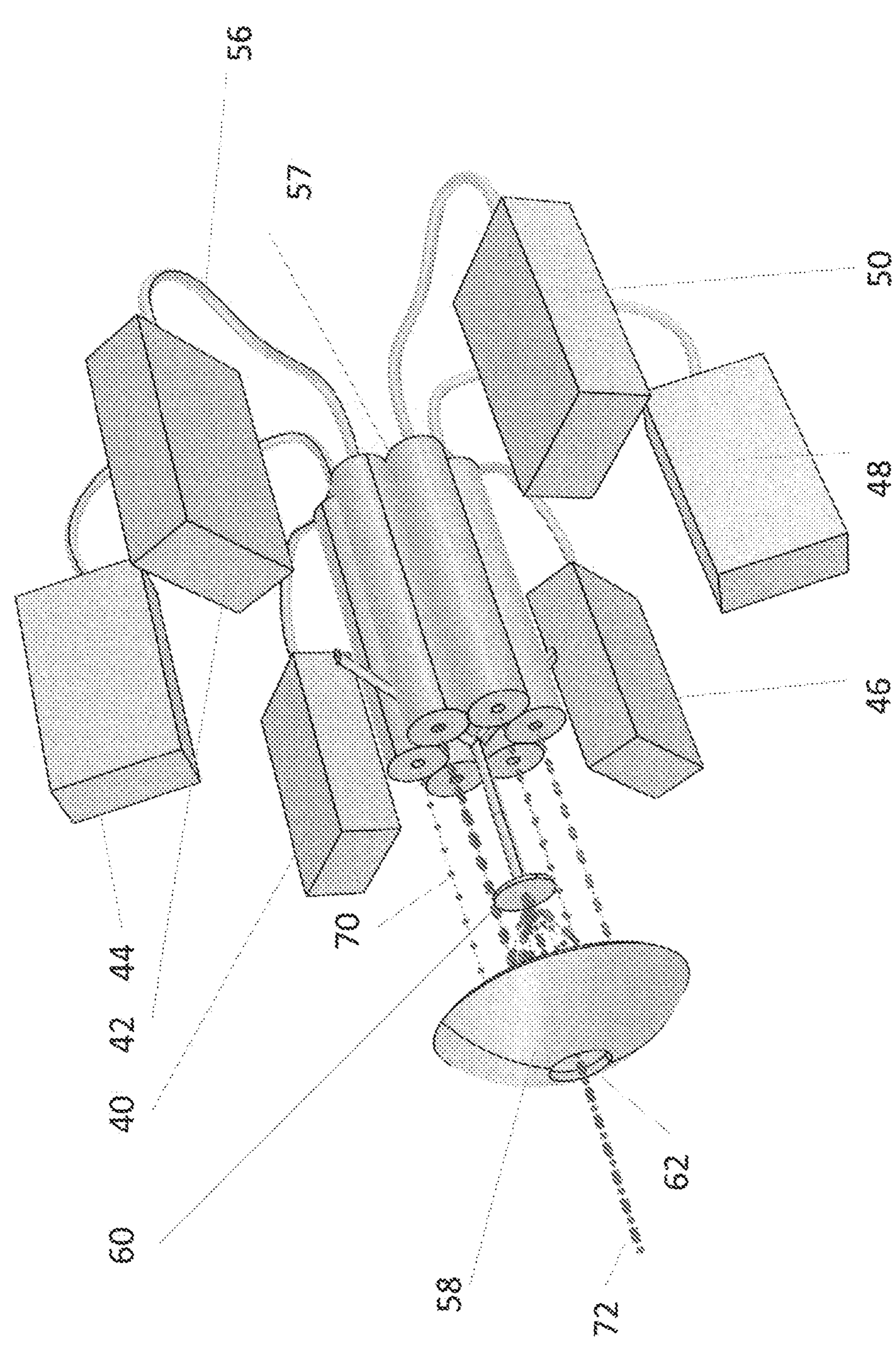
FIG. 7 is a view of the device of FIG. 5 with the laser beams shown.

Reference is now made to FIG. 6, which is a cutaway drawing of the device of FIG. 5 with the casing of the combiner removed. As in FIG. 5, laser sources 40, 42, 44, 46, 48 and 50 are connected to the combiner, where terminations 57 terminate the optical fibers 56. The beams go to mirror 58 where they are reflected back to mirror 60 and combined to exit at opening 62. FIG. 7 is the same view but showing the multiple beams 70 from the different laser sources being combined by the mirrors into single output beam 72.

In use, the different beams are of different wavelengths. For example one of the wavelengths may be from the red part of the spectrum and a second wavelength may be from the blue end of the spectrum. Typically, the wavelengths are selected for their different behaviors during atmospheric penetration. Thus one wavelength may tend to heat water vapor encountered more than other wavelengths and may be taken advantage of to clear a path for the other wavelengths by heating the vapor and causing currents of air to remove dust and water vapor out of the way. Hence, a particular wavelength may be provided because of its properties as a transport wavelength, to clear a path through the atmosphere and ensure that another wavelength arrives at a target with a minimum of attenuation.

The transport wavelength may actually overlap and coincide with the second of the wavelengths, or it may be alongside or surrounding the second wavelength. In either case a path may be cleared by the beam to allow the intended energy to get through without attenuation or with minimal attenuation.

The wavelengths may be pulsed, and the different wavelengths may be pulsed differently, so that each one may be optimized separately for its respective intended effect. It is further noted that more than one of the multiple laser sources may be used with the same wavelength but pulsed differently to provide different effects. The different pulses may be used to identify the different beams for example in cases where reflections of the beams are used to identify distances or atmospheric disturbances. Reflections due to atmospheric disturbances may be used to refine the atmospheric penetration of the device. For example a particular pattern of reflections may indicate a particular characteristic of the atmosphere and then the device may modify the beam by altering the pulses or wavelengths used accordingly. Such methods of characterizing the atmosphere using laser are known in the art.

The method may also be used with optical equipment to create a path through which the optical device can see without thermal distortion. Such a path may be used with an optical device intended to see into the distance, including astronomical viewing.

In an airplane travelling through fog, an embodiment may be used to clear a path of visibility for the pilots.

Reflections of the laser beam may be used to indicate changes in atmospheric conditions and make corresponding changes to the channel. In other embodiments a detector at the far end may detect changes and control the necessary changes. Such changes may involve changes in signal strength or in some cases to changes in the wavelengths used. Meteorological data may be used as an input to the laser system to optimize the system for current atmospheric conditions, and such data may be obtained for example by use of radar. Such optimization may stabilize the system even in adverse atmospheric conditions.

Figure 8:
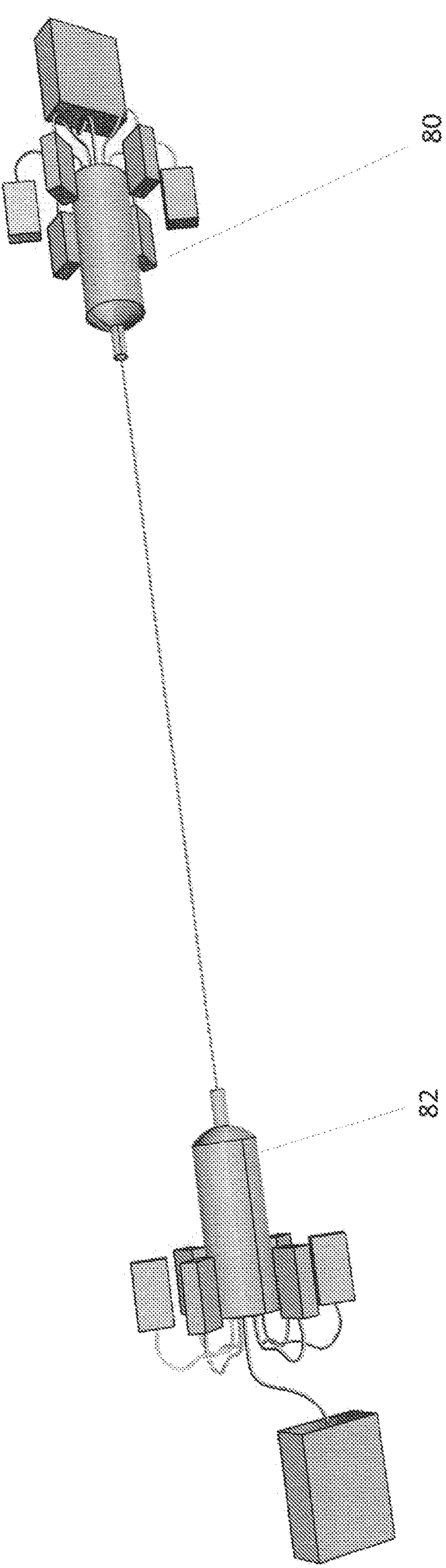
FIG. 8 is a simplified diagram showing communication between two locations along a line of sight using an embodiment of the present invention.

Reference is now made to FIG. 8, which is a simplified diagram showing a laser source 80 according to the present embodiments carrying out communication with a detector 82. If the detector 82 is also a laser source and the source 80 also includes a detector, then two-way communication is also possible. The use of multiple wavelengths as before creates a communication tunnel where the amount of distortion or diffusion or attenuation is minimized. As a result, a straight line laser communication path may be set up and less power used than in conventional laser communication. However line of sight is required by the laser.

Figure 9:
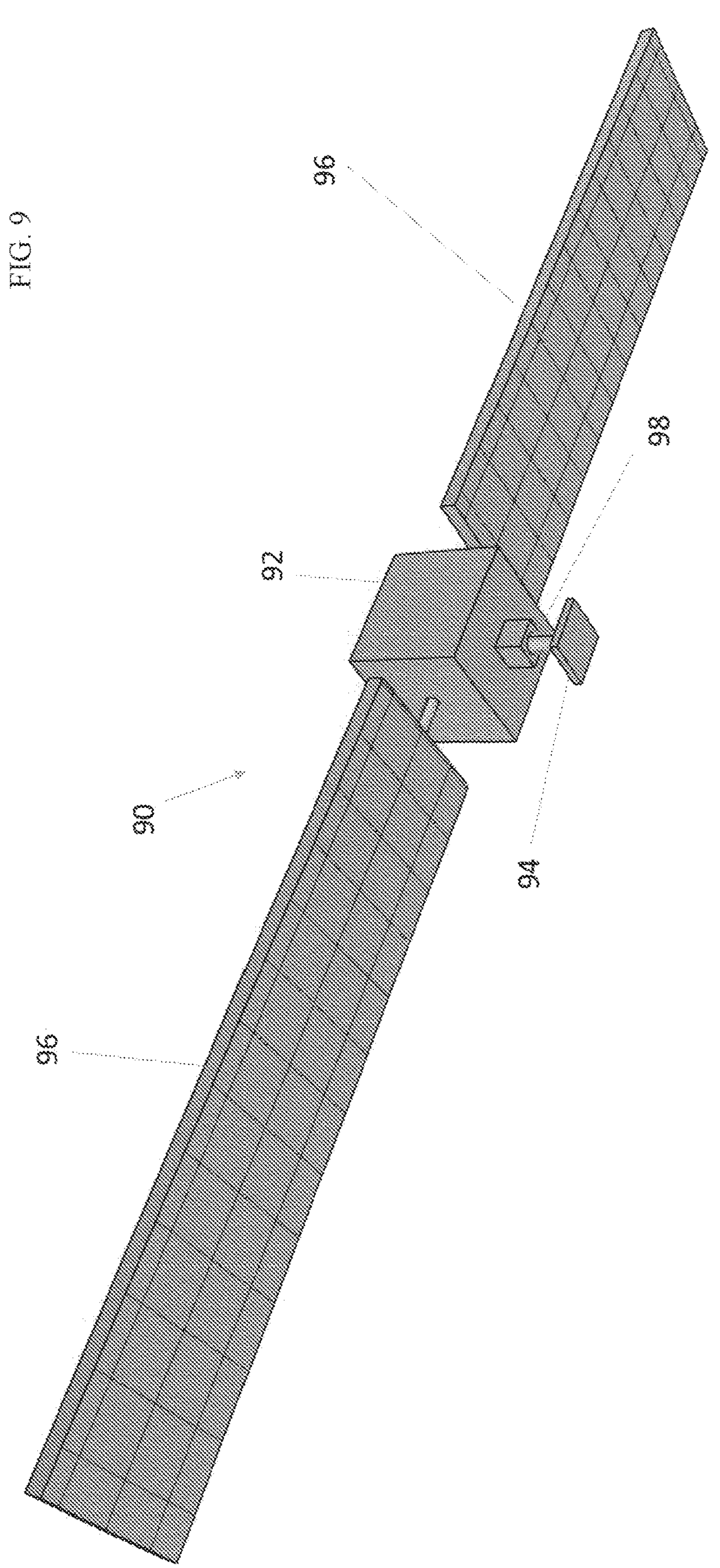
FIG. 9 is a simplified diagram showing a satellite for use with the present embodiments.

Reference is now made to FIG. 9, in which satellite 90, in earth orbit, has a body 92, a reflector 94 and solar panels 96. The satellite reflector 94 may be used to redirect the laser beam from one location to another and overcome the earth's curvature. In addition, the laser beam may be absorbed to provide power to the satellite, say in the case of failure of the solar panels. The base 98 of the reflector 94 may include a universal joint and an actuator so that the reflector angle can be accurately changed in three dimensions. It will be appreciated that a single satellite may have multiple reflectors. The multiple reflectors may deal with multiple sources and/or may deal with multiple destinations or targets. Thus a single source may control multiple missiles or multiple sources may communicate with each other or control missiles.

Figure 10:
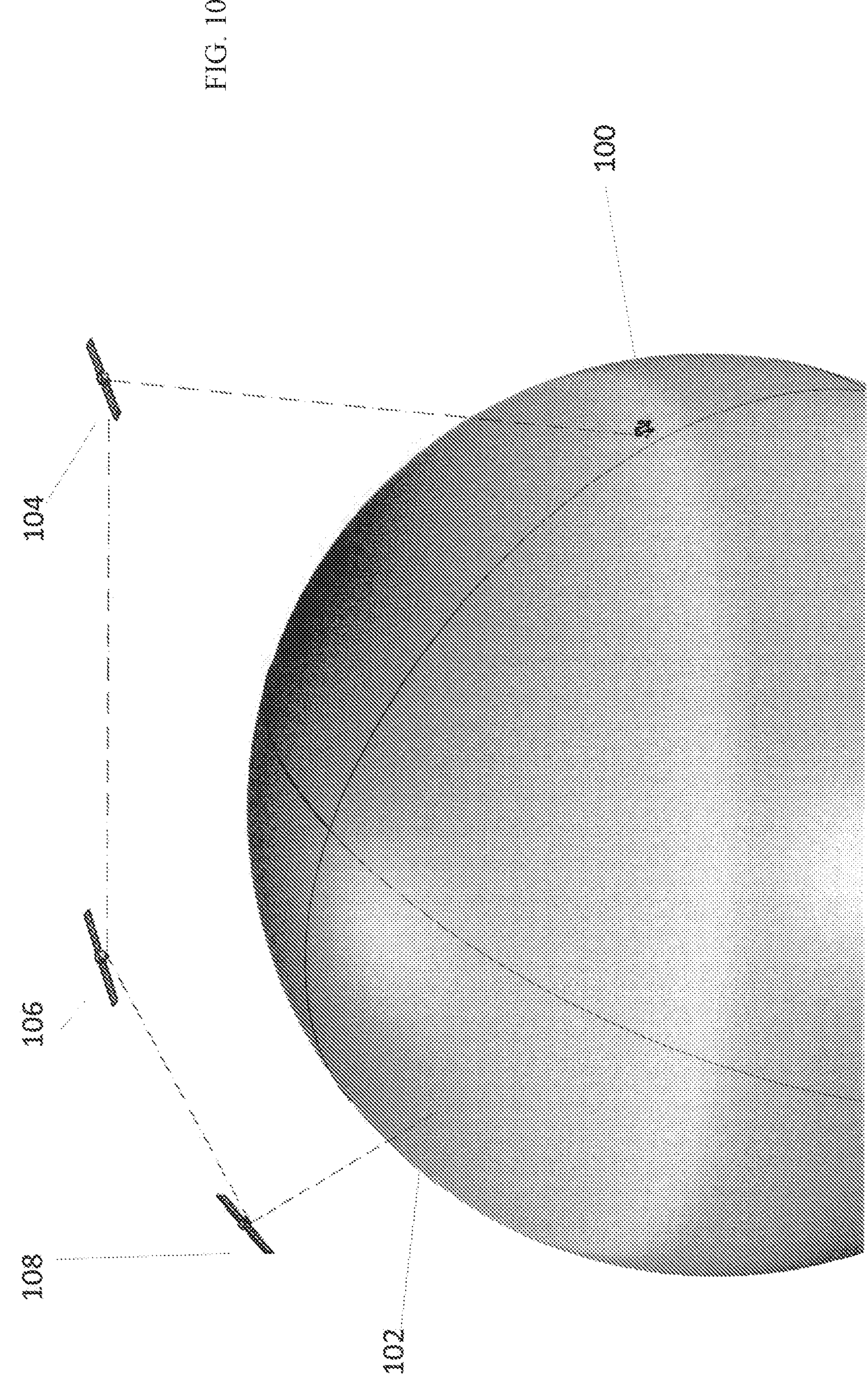
FIG. 10 is a simplified diagram showing a chain of satellites providing communication between two points on the earth's surface.

As shown in FIG. 10, communication from a first location 100 reaches a second location 102 despite the earth's curvature. The beam is the multiple wavelength beam of the previous embodiments, which creates a tunnel that is free from distortion, attenuation etc, and thus means that a laser beam may carry communication over long distances. The beam is carried between satellites 104, 106 and 108, and the satellites include reflectors as shown in FIG. 9. As above, the communication may be bidirectional.

Figure 11:
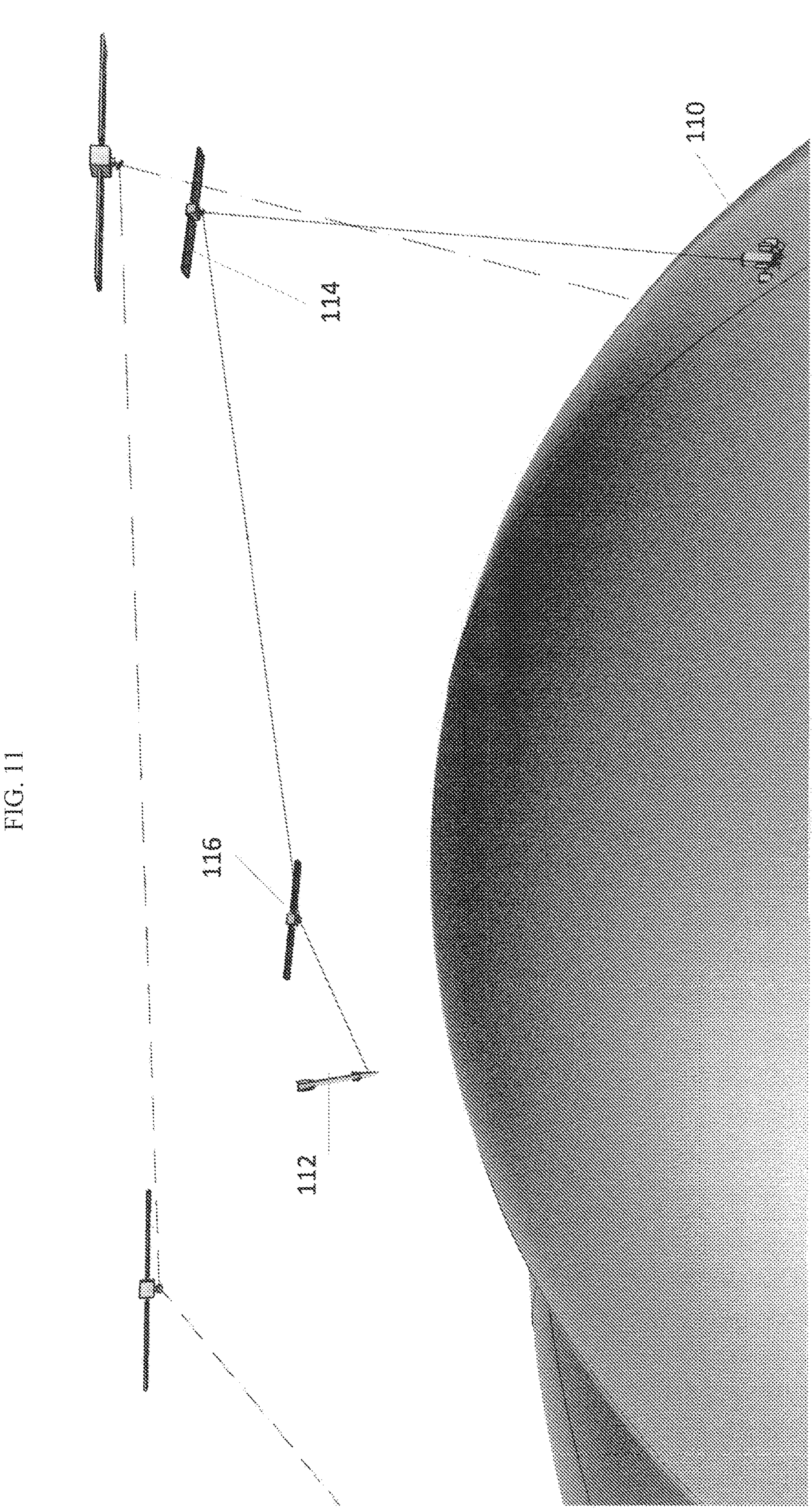
FIG. 11 shows how satellites may be used with the present embodiments to allow for control of a missile over the horizon.

Reference is now made to FIG. 11, which shoves how the laser beam may be used to control a ballistic missile over the horizon. Control station 110 controls missile 112 over the horizon. A control laser beam is sent via satellites 114 and 116, and the missile may also transmit data such as its GPS position or altitude, or speed or attitude or a view of the target etc in the reverse direction. The control beam may in fact be multiple beams from multiple sources.

Figure 12:
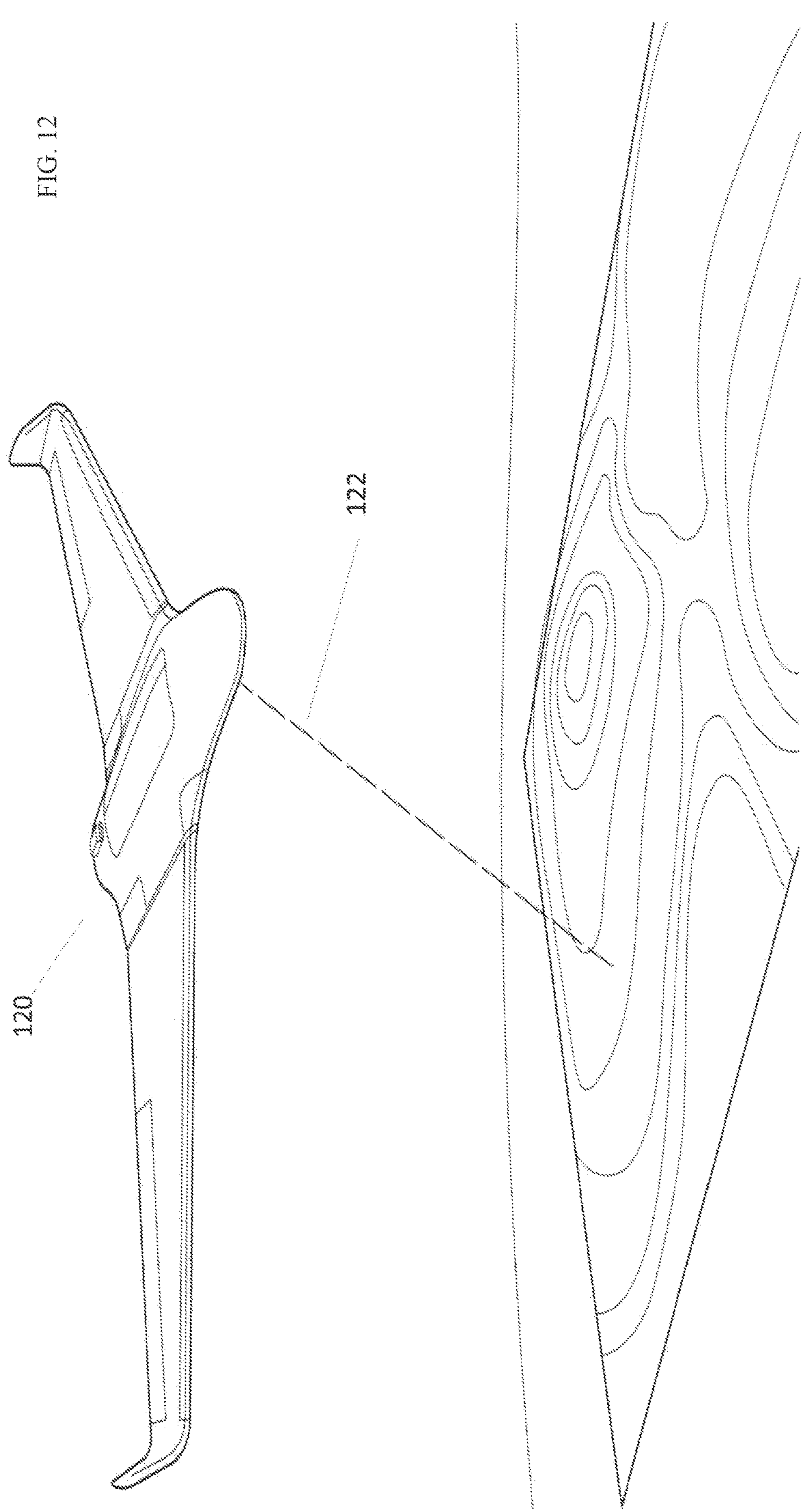
FIG. 12 shows a drone for use with the present embodiments.

Reference is now made to FIG. 12, which is a simplified diagram that shows a drone 120. The drone receives a laser beam according to the present embodiments, and in one embodiment is controlled by signaling from the beam, which gives full line of sight control. The drone is also able to relay the beam, for example to direct it to another drone that is over the horizon from the beam source, so that the drone serves in the same way as the satellite referred to above. The drone is also able to relay the beam between two ground locations to provide communication between locations that do not have line of sight. It is noted that communication is hard to intercept or interfere with since the beam is very narrow and is constantly changing its route as the drone moves.

The beam may also be used to power the drone or assist with powering the drone, so that the drone may remain airborne for longer.

Figure 13:
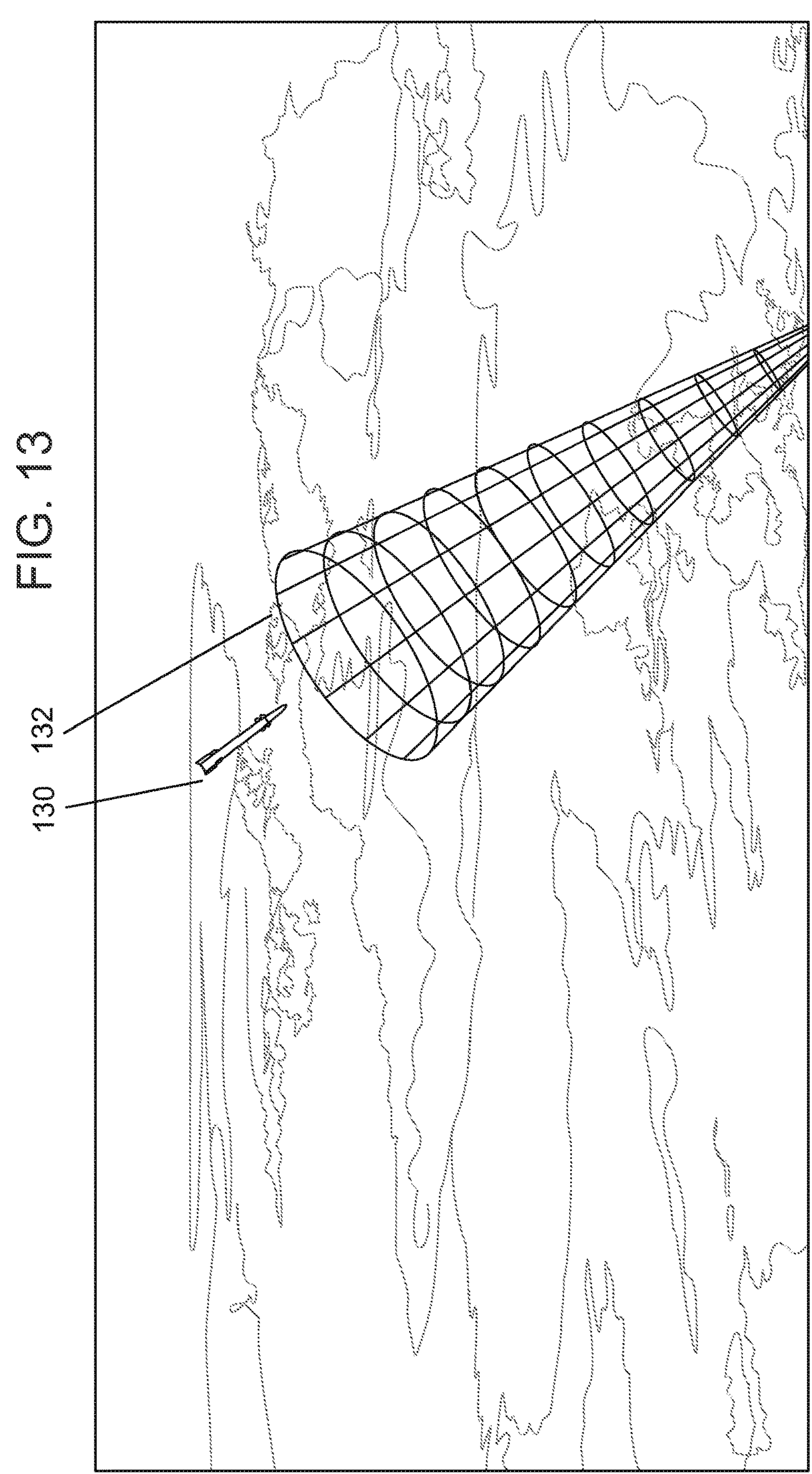
FIG. 13 shows a laser beam according to the prior art and indicating dispersal of energy of the laser beam.

Reference is now made to FIG. 13 which shows a missile 130 being controlled by a prior art laser beam 132. Despite the beam being a laser beam, atmospherics disperse the beam so that over distance there is no concentrated energy. Adaptive optics may be used to stabilize the system and achieve optimal results.

Figure 14:
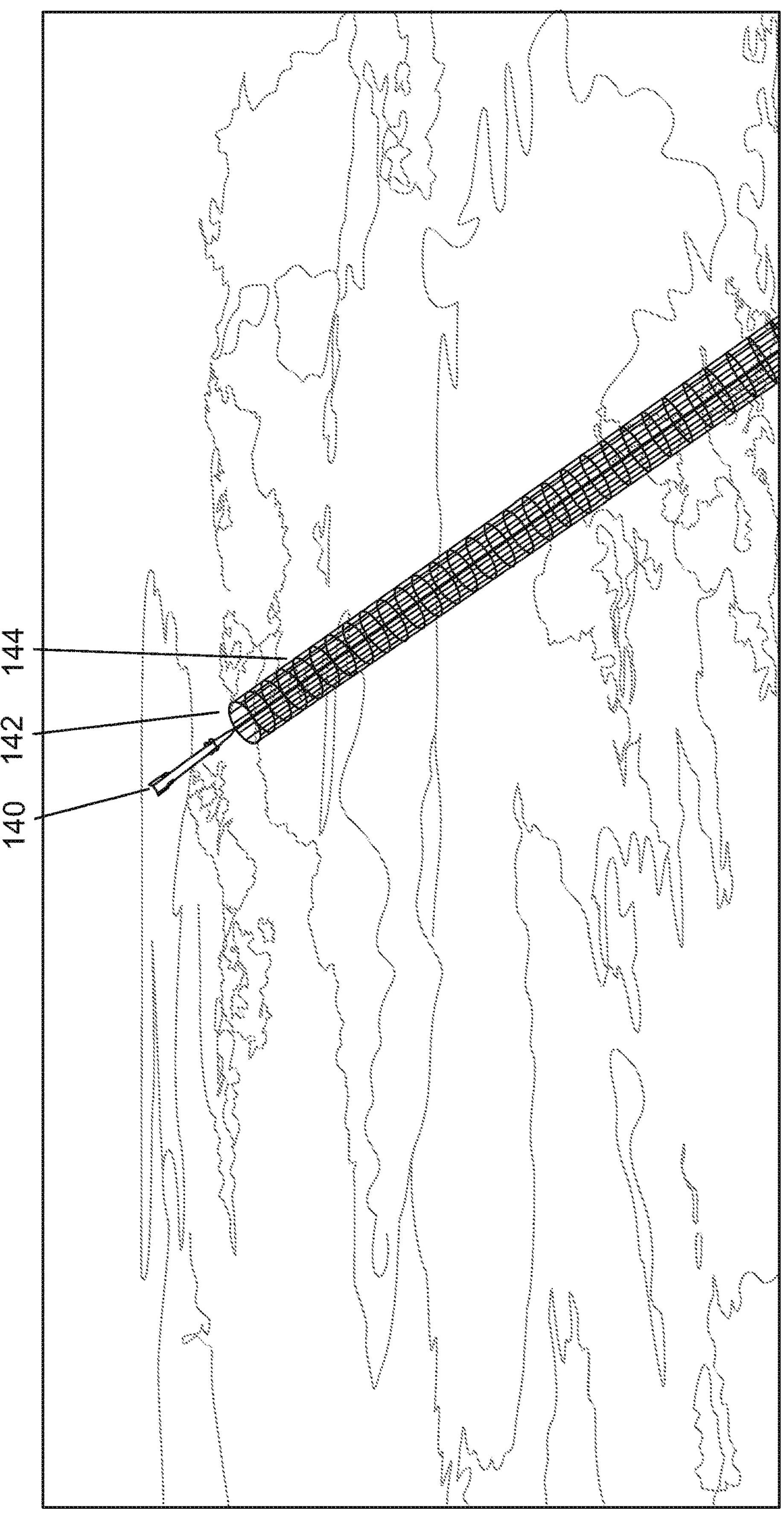
FIG. 14 is a simplified diagram showing a concentrated by an atmospheric tunnel according to embodiments of the present invention.

Reference is now made to FIG. 14 which shows a missile 140 being controlled by a beam according to the present embodiments. A tunnel 142 is set up and within the tunnel, beam 144 reaches the missile without distortion.

The devices of the present embodiments may be used to provide laser beams for any application where significant atmospheric penetration is required and in particular for those applications where minimizing power attenuation is critical.

In an embodiment, both the beams may be of the same wavelength, thus avoiding interference between the two beams. Operation may be the same in that an outer shape of beam engulfs the passage of the inner beam and thus clears a path as above. The embodiment may thus prevent or reduce terminal blaming.

In an embodiment, two combined beams may be provided side by side, so that one of the beam combinations may protect or help to protect the other beam combination from effects of directional atmospheric disturbance, such as winds. The protection may be provided by a single beam rather than a combination beam, and in an embodiment, both of the beams may be simple beams.

The device may be combined with a weather sensing system or wind sensing system so as to position the two beams to provide protection, or more generally to calibrate in respect of the weather, for the purposes of optimization etc. A third beam may be provided for calibration purposes.

It is noted that the laser beam has a defined range of efficiency through the atmosphere. The combination has an increased range of efficiency. However the combination may additionally be used to provide a stage for a further length. That is to say one combined beam may provide a tunnel that provides an initial base for a second, third and more tunnels, thus telescoping the effective range. It is possible to calculate in advance, or observe, the optimum effective beam range for a given section of atmosphere. Using telescoping it is possible to provide different optimizations for different sections of an atmospheric path. Observations may be optical or using electromagnetic means. Spectral observations may be used.

Using the above techniques, the beams being used by the system may be changed during the course of an interception operation.

It is possible for the system to hit something and detect its range at an initial low power. If the range is not consistent with the expected threat, or the range is consistent with friendly forces, the system remains at low power and does no harm. Only if the range is consistent with an expected threat is the power turned up to cause damage.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise.

It is appreciated that certain features of the invention, which are, for clarity, described in the context of separate embodiments, may also be provided in combination in a single embodiment, and the text is to be construed as if such a single embodiment is explicitly written out in detail. Conversely, various features of the invention, which are, for brevity, described in the context of a single embodiment, may also be provided separately or in any suitable subcombination or as suitable in any other described embodiment of the invention, and the text is to be construed as if such separate embodiments or subcombinations are explicitly set forth herein in detail.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety. In addition, any priority document(s) of this application is/are hereby incorporated herein by reference in its/their entirety.

What is claimed is:

1. A device comprising:

a first laser source configured to produce a laser beam of a first wavelength;

at least a second laser source configured to produce a laser beam of a second wavelength;

an optical combiner configured to combine the first and at least the second laser beams into a beam structure in which said beam of said first wavelength surrounds said beam of said second wavelength thereby to provide a single composite beam having at least two wavelengths, one of said wavelengths being selected to heat the atmosphere along the length of the beam to cause moisture and dust to dissipate and create a path for the beam of the second wavelength.

2. The device of claim 1, wherein the first wavelength and the second wavelength are selected for their different behaviours during atmospheric penetration.

3. The device of claim 1, comprising at least three laser sources, or at least four laser sources.

4. The device of claim 1, wherein said combined beam is combined with at least one further combined beam to provide telescoped laser beam stages, thereby to increase an effective range.

5. The device of claim 1, configured to provide a second combined beam alongside said combined beam, thereby to provide shielding from atmospheric disturbance.

6. The device of claim 1, combined with a weather sensing unit or a wind sensing unit.

7. The device of claim 6, comprising a second combined beam to provide said weather sensing.

8. The device of claim 1, wherein said beam of said first wavelength is selected to be absorbed in the atmosphere to a greater extent than said beam of said second wavelength.

9. The device of claim 1, wherein said combined beam is redirectable with reflectors to overcome curvature of the earth.

10. The device of claim 9, wherein said combined beam is useable together with other combined beams from other sources to interact with an object.

11. The device of claim 1, wherein said first wavelength and said second wavelength are respectively different wavelengths.

12. A device comprising:

a first laser source configured to produce a laser beam of a first wavelength;

at least a second laser source configured to produce a laser beam of a second wavelength;

an optical combiner configured to combine the first and at least the second laser beams into a beam structure in which said beam of said first wavelength surrounds said beam of said second wavelength thereby to provide a single composite beam having at least two wavelengths, one of said wavelengths being selected for absorption in the atmosphere causing moisture and dust to dissipate and create a path for the beam of the second wavelength.

13. The device of claim 12, wherein the combined beam comprises the transport wavelength alongside or surrounding the second of the wavelengths, thereby to clear a path in the vicinity of the second of the wavelengths.

14. The device of claim 12, configured to provide an outer shape using said first beam and to provide said second beam inside said outer shape.

15. A device comprising:

at least one laser source configured to produce a laser beam of a first wavelength, the wavelength selected to exert a first, absorption effect on the atmosphere;

at least a second laser source configured to produce a laser beam of a second wavelength selected to exert a second, absorption effect on the atmosphere, the second absorption effect being lower than the first absorption effect; and an optical combiner configured to combine the first and at least the second laser beams into a beam structure in which said beam of said first wavelength surrounds said beam of said second wavelength thereby to provide a single composite beam having at least two wavelengths to produce a composite effect on the atmosphere, the first wavelength selected to heat the atmosphere along the length of the beam causing moisture and dust to dissipate and create a path for the beam of the second wavelength.

16. The device of claim 15, further comprising an optical sensor, the optical sensor being aligned along the composite beam.

17. The device of claim 16, wherein the optical sensor is an astronomical sensor.

18. The device of claim 15, further configured to use reflections from said wavelengths to optimize said combined beam in the face of atmospheric changes.

19. The device of claim 18, further configured to use radar or meteorological data to optimize said combined beam.

20. A device comprising:

a first laser source configured to produce a laser beam of a first wavelength;

at least a second laser source configured to produce a laser beam of a second wavelength; and an optical combiner configured to combine the first and at least the second laser beams into a beam structure in which said beam of said first wavelength surrounds said beam of said second wavelength wherein said beam of said first wavelength is selected to be absorbed in the atmosphere to a greater extent than said beam of said second wavelength.

21. The device of claim 20, wherein said combined beam is configured to carry communication with an object.

* * * * *